United States Patent Office 3,534,860
Patented Oct. 20, 1970

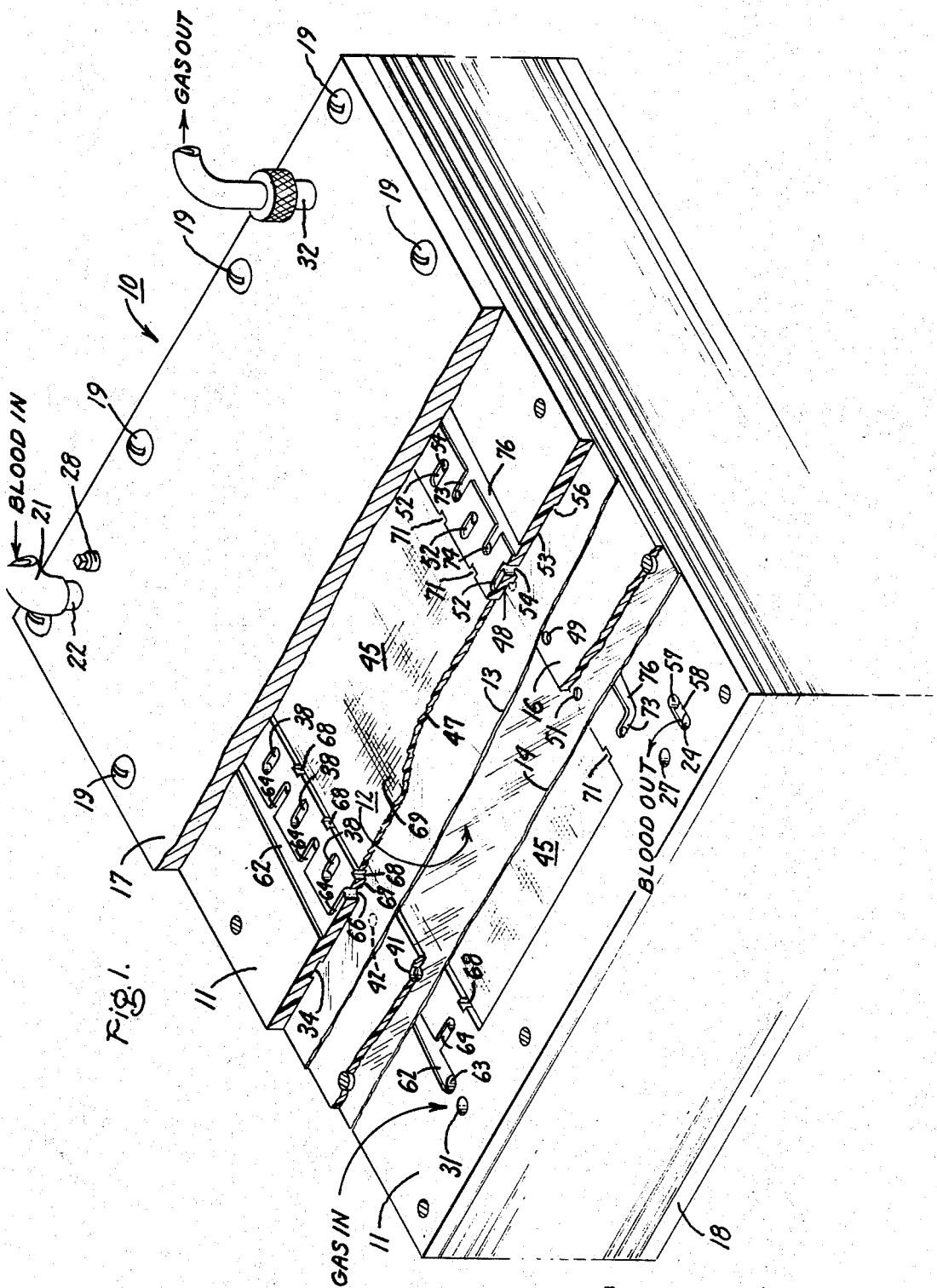

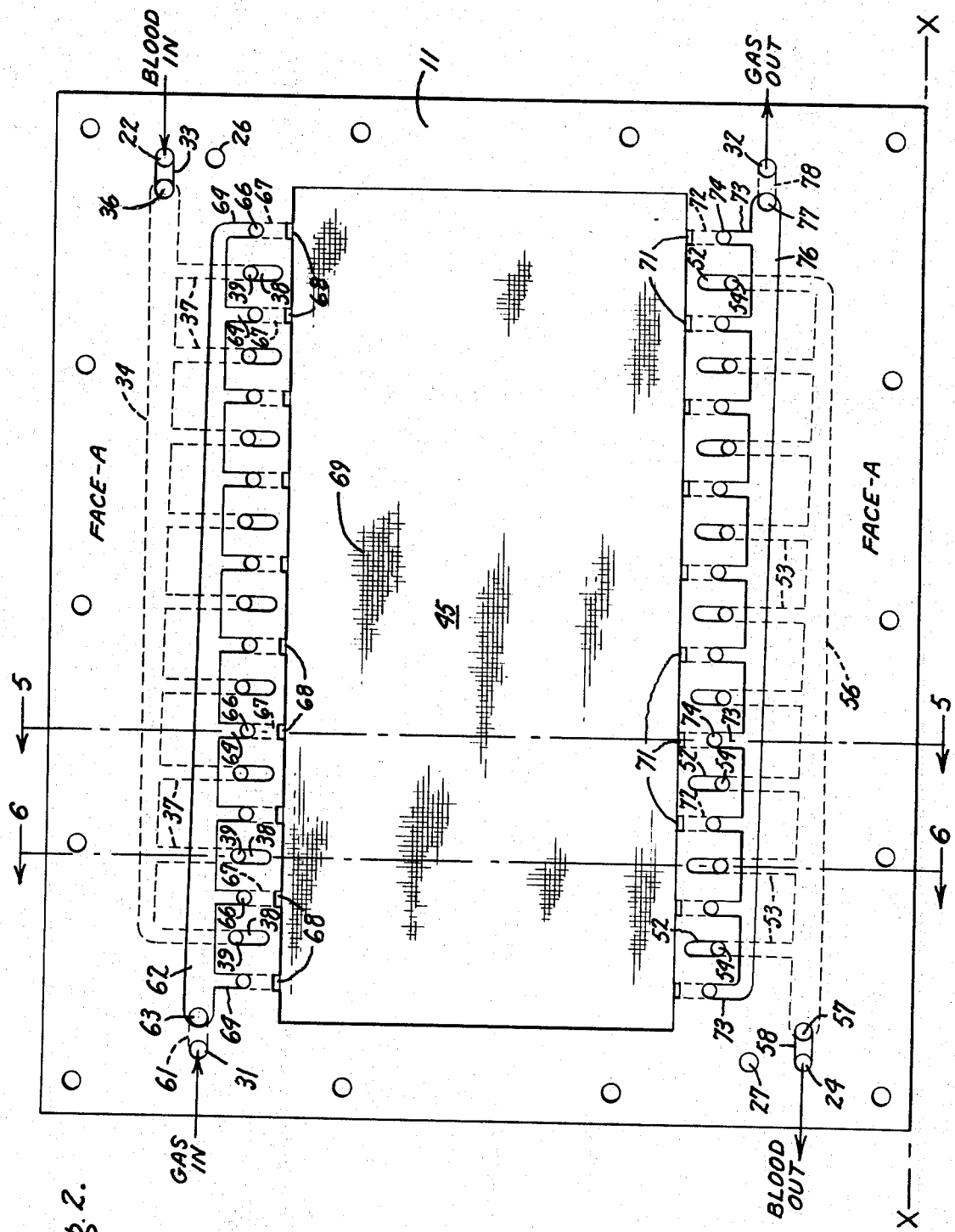

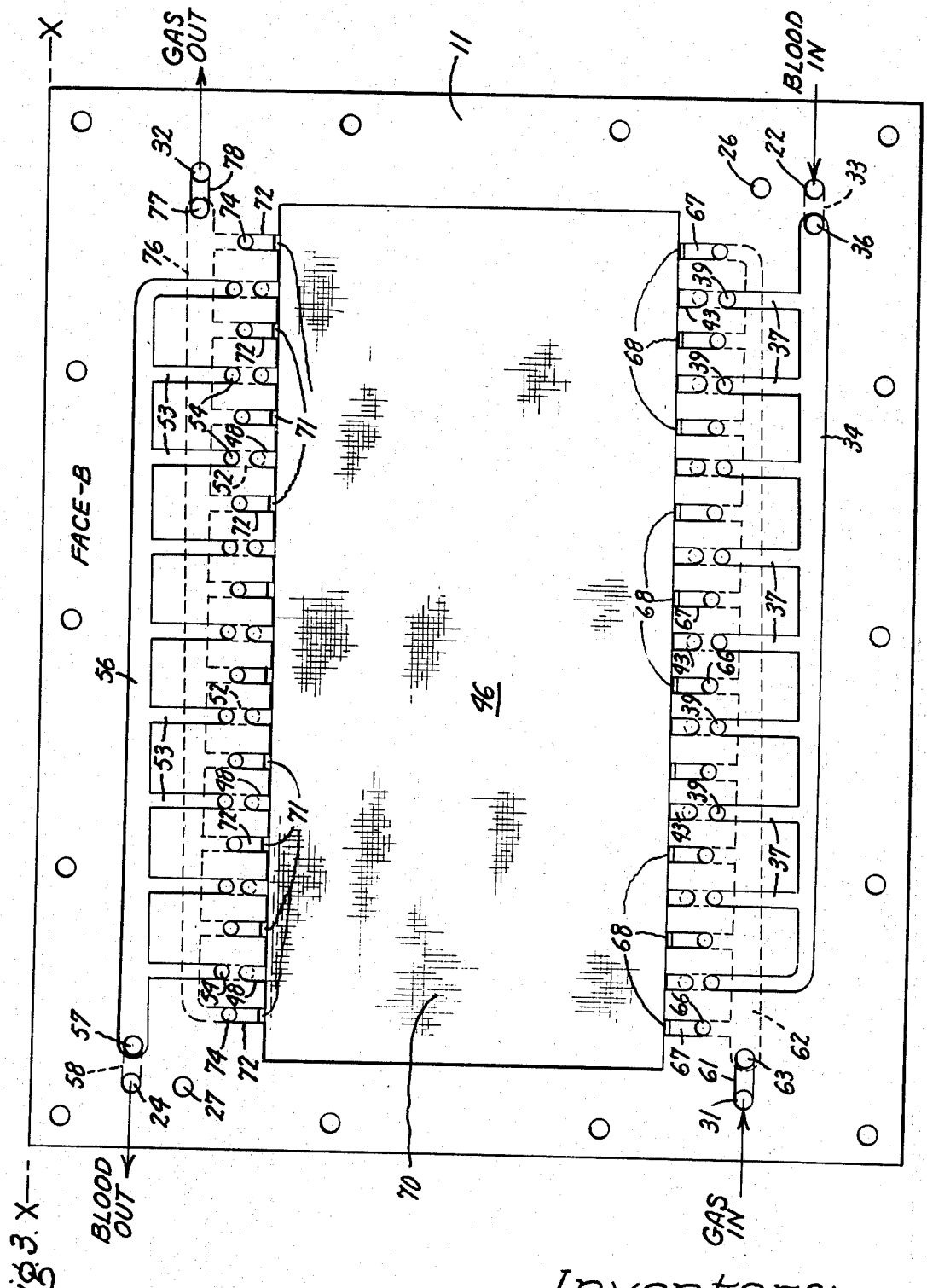

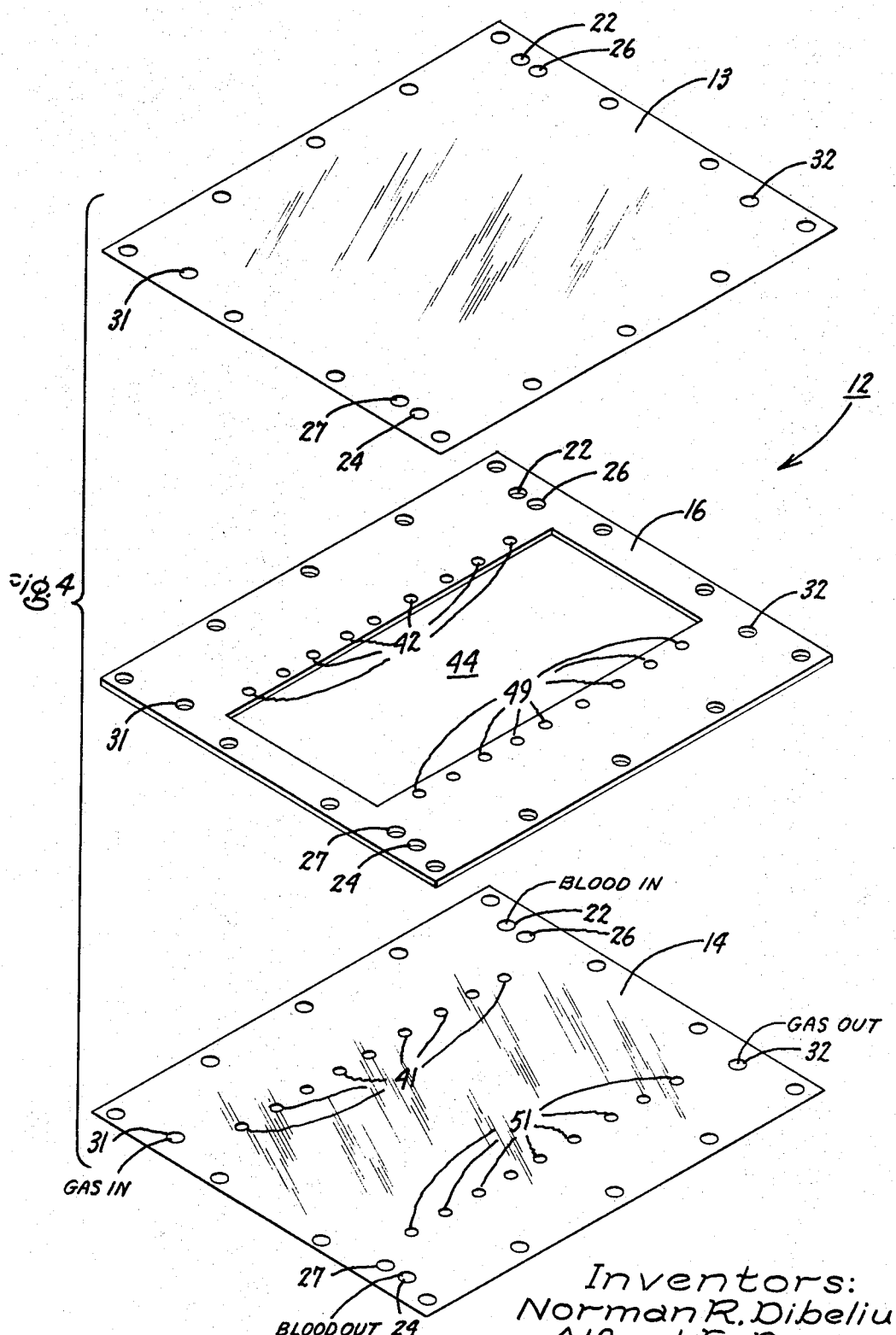

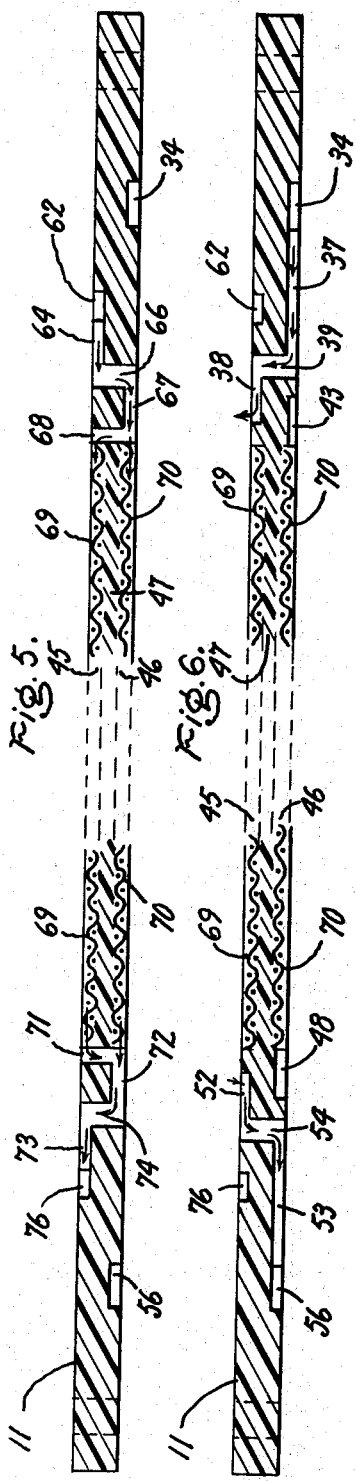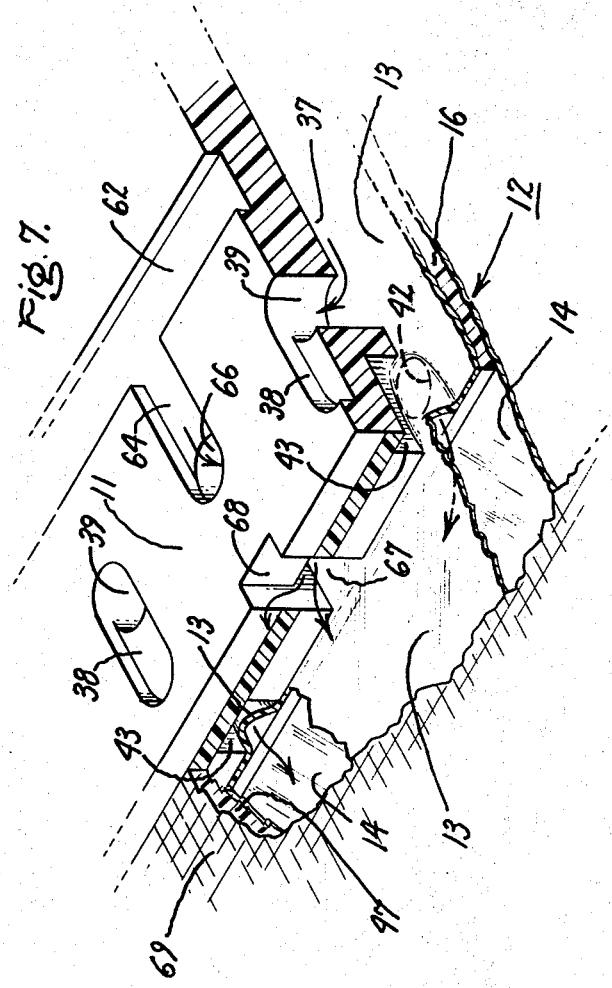

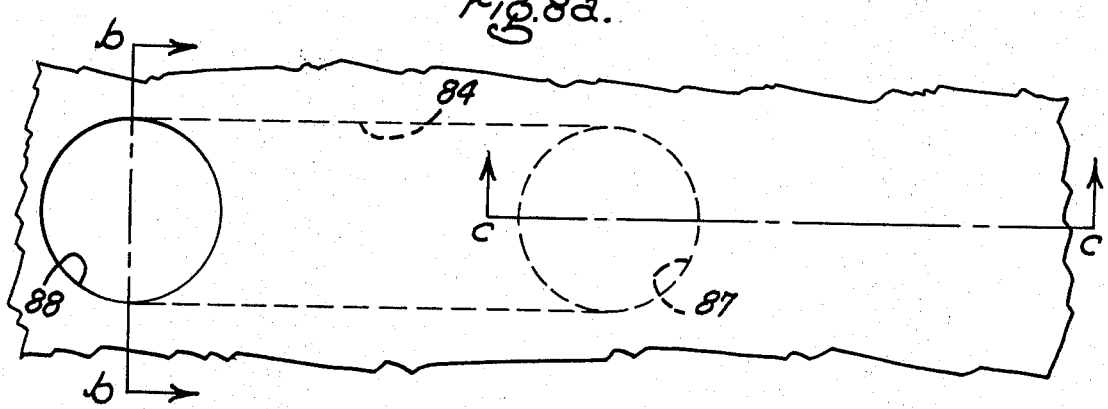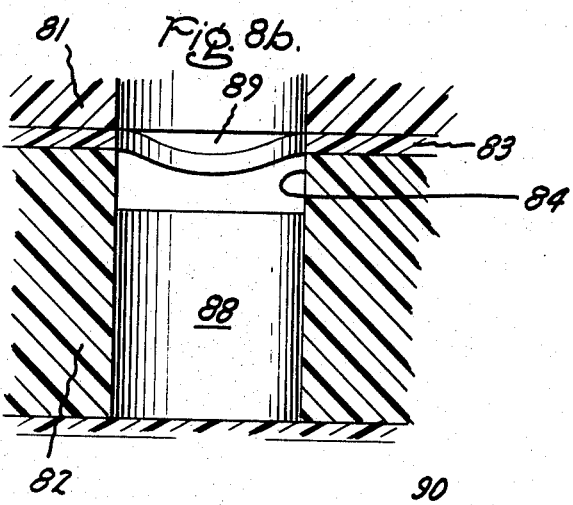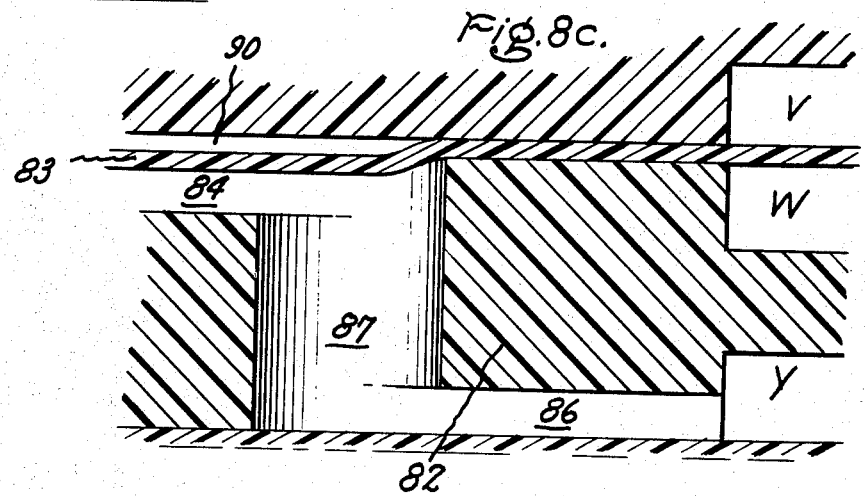

3,534,860
PRESSURE SEAL-MANIFOLD UNIT
Norman R. Dibelius, Ballston Spa, and Alfred E. Dreves, Scotia, N.Y., assignors to General Electric Company, a corporation of New York
Filed Nov. 29, 1968, Ser. No. 779,933
Int. Cl. B01d *13/00*
U.S. Cl. 210—321        11 Claims

ABSTRACT OF THE DISCLOSURE

A manifold unit for dispersing two fluids (e.g. blood and oxygen) in separate flows to, and from, opposite sides of a thin septum, or membrane, is described, which unit (when assembled in a membrane device) will seal to other structural elements in contact with the opposite major faces thereof simply by the application of pressure. The improved pressure seal capability is made possible by the use of Z-shaped flow distribution channels. Pressure seal-manifold units constructed in the manner of this invention may be used either with membrane envelopes or whether adjacent manifold units are disposed with unlike surfaces in juxtaposition or with like surfaces in juxtaposition, respectively.

BACKGROUND OF THE INVENTION

In the preparation of membrane devices used as artificial kidneys, blood oxygenators, gas separation (or gas concentration) devices and reverse osmosis desalination devices the individual components comprising the unit are separately manufactured, assembled and then bonded together to form a sealed, integrated device.

Those structural components which define the flow passages may be made either as flat sheets with horizontal flow passages cast completely internally of the sheets or with the horizontal flow passages recessed in the major surface of the flat sheets. In the former case the dies to cast such sheets are very difficult to make and maintain in useable condition although positive sealing is obtained between abutting flat surfaces. In the latter case the die preparation is vastly simplified, but flow passages which extend substantially horizontally between points of termination have a propensity to leak, because of the incapacity to exert positive sealing pressure at the terminals thereof in the area of the recessed flow passages themselves.

Having the capability for safely employing a pressure seal to obviate bonding between adjacent elements would considerably lower production costs and also provide for easy disassembly, cleaning and reassembly of such units.

SUMMARY OF THE INVENTION

The above-mentioned need is met with the instant invention, which is primarily directed to a compound manifold and flow distribution unit referred to herein as a "flow sheet." A horizontally disposed, longitudinally-extending manifold recessed into one major face of the flow sheet receives a first fluid from a vertical manifold in communication therewith and through a series of Z-shaped flow channels distributes this first fluid to an exchange area recessed in the surface of the flow sheet, where the first fluid is disposed on opposite sides of a membrane from a second fluid. Having traversed the exchange area the first fluid is received by a second set of Z-shaped flow channels, which conduct the first fluid to a second longitudinally-extending manifold recessed into the same major face of the flow sheet through which the first fluid is free to flow to a second vertical manifold and leave the flow sheet. The flow sheet is also provided with a completely separate manifold-flow distribution system for a second fluid employing similar longitudinally-extending manifolds recessed into the opposite major surface of the flow sheet, Z-shaped flow channels and vertical manifolds in order to dispose this second fluid into exchange relationship with the first fluid as will be described in greater detail below.

The major surfaces of the flow sheet are parallel to each other and flat (except for recessed portions) and can be reliably urged into sealing engagement with membrane surfaces disposed between a pair of such flow sheets. Since the Z-shaped flow channels are used in place of horizontal flow channels, along any such flow channel there is a possibility for leakage to the wrong side of the membrane only along each horizontal leg of these flow channels, because positive barriers to continued flow (other than in the flow channels themselves) occur at each horizontal/vertical change of direction.

BRIEF DESCRIPTION OF THE DRAWING

FIG. 1 is a three-dimensional cutaway view of a stack of flow sheets arranged in a membrane device in face-to-underside disposition with a membrane envelop disposed between adjacent flow sheets;

FIG. 2 is a plan view showing the top of any flow sheet showing the relationship between one set of longitudinally-extending recessed manifolds, flow distribution channels, vertical manifolds and recessed exchange area;

FIG. 3 is a plan view showing the underside of the same flow sheet as disposed after turning the flow sheet over (rotating around the line X—X) and showing the relationship between the second set of longitudinally-extending recessed manifolds, flow distribution channels, vertical manifolds and recessed exchange area;

FIG. 4 is an exploded view (reduced in size) of a membrane envelop to be disposed between flow sheets showing the upper membrane, separator, and bottom membrane, respectively, of the membrane envelop (the underside of each of these elements has exactly the same configuration as shown herein other than for the reversal of position of the vertical manifold holes, when the sheets are turned over);

FIG. 5 is a section taken along the line 5—5 of FIG. 2 showing the paths of flow for a first fluid to and from recessed horizontal manifolds via Z-shaped flow distribution paths;

FIG. 6 is a section taken along the line of 6—6 of FIG. 2 showing the path of flow for a second fluid to and from recessed horizontal manifolds via Z-shaped distribution channels, FIG. 7 is a three-dimensional view illustrating the disposition of the membrane envelop in relation to a flow sheet located thereabove and showing the manner of entry of a selected fluid flow into the membrane envelop by distention of a portion of the top membrane thereof into recesses provided therefor in the flow sheet and FIGS. 8*a*, 8*b*, and 8*c* illustrate the manner in which the utilization of Z-shaped flow channels eliminates leakage paths along the wrong side of an exchange membrane.

DESCRIPTION OF THE PREFERRED EMBODIMENT

The assembled membrane device 10 shown in FIG. 1 embodies the pressure seal-manifold unit of the instant invention and may, for example, be employed as an artificial kidney, blood oxygenator or device for gas separation or gas concentration. Although this disposition of pressure seal-manifold units may be used for reverse osmosis devices, it is preferable to employ an arrangement described hereinbelow employing single membranes, rather than membrane envelopes. Such a device may also be used for low cost foil, or plastic, heat exchangers. Because of the pressure sealing capability of the flow sheet of this invention the cured assembly elements (flow sheets and membrane envelopes) need only be pressed together in the manner of gasketing to seal the unit and assure separate flow paths for the fluids to be disposed in some exchange relationship.

A repetitive stack arrangement of flow sheets 11 (each with the same face thereof turned upwardly) is shown interleaved with membrane envelopes 12, each of which consists of top membrane 13, bottom membrane 14 and separator 16. The materials from which the components thus described are prepared need only be capable of retaining structural integrity under the operating conditions and be compatible with the fluids employed. Preferably, the material(s) should be moldable. Thus, if the membrane device 10 were to be used as a blood oxygenator (as will be described herein to illustrate the invention) the flow sheet could be made of plastic such as polypropylene, polycarbonate or polytetrafluoroethylene, for example. In the case of use of the membrane device 10 as a heat exchanger, the flow sheet could be made of metal, if desired. Separator 16 may be made of the same material as is employed for flow sheet 11.

Selection of the membrane material would be on the basis of the function being conducted in the membrane device. Thus, in a blood oxygenator, membrane gas separator or gas concentration device non-porous perm-selective membranes having a thickness of about 1 mil or less of organopolysiloxane (U.S. Pat. 3,325,330—Robb), organopolysiloxane-polycarbonate copolymer (U.S. Pat. 3,189,662—Vaughn, Jr.), poly-2,6-diphenylphenylene oxide or poly-2,6-dimethylphenylene oxide may be used. Films of regenerated cellulose, nitrocellulose, polyvinyl resins, etc. may be employed as dialysis membranes in such a structure for separating crystalloids from the liquid in which they are contained. Films of modified cellulose acetate or sulfonated-brominated $P_3O$ may be used, for example, in reverse osmosis structures according to this invention.

The interleaved stack of flow sheets 11 and membrane envelopes 12 are disposed between pressure plates 17 and 18 and urged into sealing engagement by clamping bolts 19. In the case of a blood oxygenator, incoming blood would be supplied through conduit 21, which is in flow communication with vertical manifold 22, while blood leaving the device 10 would exit through a conduit (not shown) in flow communication with vertical manifold 24. The vertical manifolds 26 and 27, which are not in use in the instant arrangement may be closed off by screw plugs (plug 28 shown). Similar means are provided for the inflow and outflow of the oxygenating gas via vertical manifolds 31 and 32. As may be seen in FIGS. 2 and 3, incoming blood (vertical manifold 22) enters the flow sheets 11 through recessed passageway 33 in face A (top) of each flow sheet. Blood traversing passageway 33 reaches horizontal manifold 34 recessed in face B via penetrating passage 36, which passes through flow sheet 11. The open side of manifold 34 is closed off by that membrane 13, which is part of the envelop 12 interposed between the given flow sheet 11 and the flow sheet 11 adjacent thereto at the underside thereof. Other membranes 13 and 14 close off other recesses in the same manner in the assembled device.

Blood is distributed from manifold 34 along Z-shaped feeder channels consisting of horizontally-extending recessed legs 37 and 38 in faces A and B of flow sheet 11, respectively, connected by penetrating channels 39. The blood reaching portions 38 of the Z-shaped distribution channels is under enough pressure so that it passes upwardly through holes 41 of membrane 14 and holes 42 of separator 16 forcing against the solid surface of membrane 13 (which has no holes permitting blood flow therethrough other than the vertical blood manifolds and these do not communicate with holes 41 and 42).

Non-porous membrane 13 must, of necessity, be very thin in order to optimize permeation therethrough and, because this membrane is unsupported over its upper surface at each recess 43, the membrane 13 is distended by the force of the blood flow upward into each recess 43 a sufficient extent to permit the flow of incoming blood between the contiguous surfaces of separator 16 and membrane 13.

In this manner, the incoming blood enters the interior of membrane envelop 12 to flow through the region between opposed membrane 13 and 14 in the window 44 through separator 16. In the assembled device, this window 44 of separator 16 coincides with recessed exchange areas 45, 46, respectively, above and below each impermeable web 47 of flow sheet 11 to which the oxidizing fluid to regions 45, 46 is distributed in the manner described below. The blood in envelop 12 sweeps across the window area 44 to location in juxtaposition with recessed portions 48 of each flow sheet 11 where portions of membrane 13 are distended upwardly into recesses 48 thereby permitting the flow of blood out of envelop 12 through holes 49 (in separator 16) and holes 51 (in membrane 14) aligned therewith. Holes 51 are also aligned with recessed horizontal legs 52 of the Z-shaped channels comprising recessed horizontal channels 52 and 53 in faces A and B, respectively, of flow sheet 11 and the penetrating channels 54 interconnecting them as shown. Thus, freshly oxygenated blood leaves each envelop 12, flows downwardly and enters the Z-shaped channels leading to recessed horizontal manifold 56 in face B of flow sheet 11. Thereafter, the oxygenated blood leaves membrane device 10 via vertical manifold 24 and an outlet pipe (not shown) in flow communication therewith having reached vertical manifold 24 from the horizontal manifolds 56 via penetrating channels 57 and horizontal channels 58 recessed in faces A of flow sheet 11.

The dispersal of the oxidizing phase, as for example oxygen gas, through the oxygenator device 10 begins at vertical inflow manifold 31. At each flow sheet 11 oxygen enters horizontal passage 61 recessed into face B of flow sheet 11 and, thereafter, flows to the horizontally-extending manifold 62 recessed into face A of flow sheet 11 via penetrating channel 63. Distribution of the oxygen through Z-shaped channels, much as in the case of the blood distribution, carries the oxygen along recessed horizontal channels 64, penetrating channels 66 and recessed horizontal channels 67 presenting the oxygen to vertically-extending slots 68, which introduce the incoming oxygen to recessed regions 45 and 46 (above and below) the web portion 47 of any given flow sheet 11. The flow of the oxygen between web 47 and membranes 13 and 14 is provided for by the presence of spacing screens 69, 70 which are preferably partially embedded in the surfaces of web 47. The outermost projections of screens 69, 70 extend just short (about 1–2 mils) of reaching the top surface the planes of faces A and B, respectively.

If desired, various geometrically arranged projections may be formed integrally with web 47 to exercise this same function of keeping the membranes 13 and 14 spaced from the plane surfaces of web portion 47 and still permit the oxygen to freely traverse areas 45, 46 in order to execute the requisite gas exchange through membranes 13 and 14. At the same time as oxygen passing from areas 45, 46 through membranes 14 and 13, respectively, into the blood flow, carbon dioxide is simultaneously leaving the blood, passing through these same membranes in the opposite direction to enter the oxygen flow in areas 45, 46 to and, thereafter, being carried out of the system along with this flow. The oxygen flow traverses regions 45, 46 until it reaches vertical slots 71 through which the $CO_2$-containing oxygen passes to reach the exhaust Z-shaped flow channels consisting of recessed horizontal channels 72, 73 interconnected by penetrating channels 74. From channels 73 the $CO_2$-contaminated oxygen flow reaches horizontally-extending manifold 76 recessed into the face A of flow sheet 11 and then passes to the exhaust vertical manifold 32 via penetrating channels 77 and horizontally-extending channels 78 recessed into face B of each flow sheet 11.

If it should be preferred to employ a single membrane in place of membrane envelope 12 to provide for the exchange of gases (or in the case of a heat exchanger, of the transfer of heat) it is merely necessary to dispose flow sheets 11 in pairs with faces A in opposition separated and flanked by single membranes such as membrane 13. When flow sheets 11 are disposed in this single membrane arrangement, vertical manifolds 22 and 24 no longer exist and the individual holes, which form vertical manifolds 26 and 27 as they exist in device 10, have been re-arranged in combination with the individual holes, which form vertical manifolds 31 and 32 in device 10, to produce an entire new set of four vertical manifolds providing for the admission and discharge of separate fluids. The horizontally-extending recessed manifolds 62 and 76 and the Z-shaped flow channel distribution system connected thereto are the flow distribution components, manifolds 34, 56 and Z-shaped flow channels connected therewith being out of flow communication with the vertical manifolds.

With this latter stack arrangement (each pair of flow sheets with faces A in opposition having the faces B thereof in opposition to faces B of similar pairs to either sides thereof), the vertical inflow manifold 26 communicates with manifold 62 of alternate flow sheets 11. Vertical flow manifold 27 will be in flow communication with manifold 76 of each of these same flow sheets 11. In the same manner the vertical fluid manifolds 31 and 32 will be in flow communication with manifolds 62 and 76, respectively, of the remaining flow sheets 11, which do not communicate with vertical manifolds 26 and 27. Membranes 13 (rather than envelopes 12) are interleaved between all adjacent flow sheets 11 and in the arrangement described these membranes 13 will have, on the one side thereof, fluid admitted through vertical manifold 26 and leaving through vertical manifold 27 and, on the opposite side thereof, fluid entering through vertical manifold 31 and leaving through manifold 32.

Thus, the pressure seal-manifold unit of this invention may, together with the requisite membranes or membrane envelopes, be incorporated in alternate membrane devices, such as have been described herein. Although the description herein has been for co-current flow, the flow direction is optional. The sealing of these manifold units (flow sheets 11) is accomplished merely by urging that flat surfaces A, B into intimate contact with adjacent membrane surfaces as by clamping bolts 19. The benefits in utilizing the Z-shaped flow channels may be seen in the schematic representation in FIGS. 8a, 8b, and 8c. FIG. 8b is a section taken on line b—b of FIG. 8a and FIG. 8c is a section taken on line c—c of FIG. 8a. FIG. 8a is a view in plan of an assembly of a pair of flat plates 81, 82 (e.g. flow sheets) with an exchange membrane 83 disposed therebetween.

Lower plate 82 has a groove 84 recessed in its upper surface and a groove 86 recessed in its lower surface. Grooves 84 and 86 are interconnected by the transverse passage 87. Groove 84 is in flow communication with a source 88, e.g., a vertical manifold supplying a given fluid and groove 86 is in flow communication with an exchange region Y. Similar exchange regions are shown at W and V.

It is desired to convey the given fluid from point X to some preselected exchange region. In the arrangement shown the flow will be from point X to exchange region Y employing the Z-channel arrangement. This construction is to be compared to a hypothetical case (not shown) in which the given fluid would be conducted straight to exchange region W by an extension of groove 84 (no Z-shaped channel arrangement).

As may be seen in FIG. 8b the portion of membrane 83 straddling groove 84 has no support thereunder and will, therefore, leave a gap 89 and channel 90 along which some of the given fluid may pass. This flow leak is, of course, undesirable. The correctly directed flow of the given fluid will pass through opening 91, along groove 84, passage 87 and groove 86 to reach exchange region Y. The flow leak along channel 90 can parallel the properly directed flow only as far as passage 87. Here the properly directed flow passes away from membrane 83 along passage 87, while channel 90 must terminate, because of the positive sealing action obtained at the interfaces between plates 81, 82 and membrane 83 beyond passage 87.

If the Z-shaped flow path of this invention were not used as in hypothetical situation in which groove 84 would be extended straight to exchange region W, the flow leak would continue all the way to region V, where the given fluid would issue on the wrong side of membrane 83.

The problem of leakage is obviated in the instant invention, because the flat surface area around each recessed passageway or manifold is pressed into sealing engagement with flat surfaces around each recess and around each vertical (penetrating) hole, e.g. channels 39, 54, 66 and 74.

Not only does the pressure seal-manifold unit offer modular versatility in membrane device construction, but such devices, because of the elimination of the need for bonded seals, may be easily disassembled, cleaned and reassembled.

The preferred configuration for the horizontally-extending recessed manifolds is tapered in the manner shown to provide a variable cross-section which evenly distributes fluid flow to and from the Z-channels. Although the flow sheet is rectangular in shape with the recessed longitudinally-extending manifolds disposed generally parallel to each other on opposite sides of a rectangular exchange area, these are merely the preferred configurations and other shapes may be readily substituted therefor.

What we claim as new and desire to secure by Letters Patent of the United States is:

1. A modular manifold unit consisting of a single flat sheet having a plurality of recessed areas in opposite first and second major surfaces thereof and having a plurality of passageways passing through said sheet to define with said recessed areas two separate passage systems for the distribution of fluid flow, said passage systems comprising:
    (a) first and second juxtaposed exchange areas recessed into said first and second major surfaces, respectively, and separated from each other by a substantially fluid-impermeable barrier,
    (b) first and second longitudinally-extending manifolds recessed in said first major surface and located with said first exchange area disposed therebetween,
    (c) first and second sets of Z-shaped channels connected to and providing flow communication between said first and second manifolds, respectively, and said second exchange area,
    (d) first and second sets of passage interconnecting said first and second sets of Z-shaped channels, respectively, with said first exchange area,
    (e) third and fourth longitudinally-extending manifolds recessed in said second major surface and located with said second exchange area disposed therebetween,
    (f) third and fourth sets of Z-shaped channels connected to and providing flow communication from said third and fourth manifolds, respectively, to a series of locations in said first major surface isolated from said first exchange area,
    (g) a plurality of passageways recessed in said second major surface and communicating with said second exchange area at least one of said passageways being vertically aligned with one of each of said series of locations, and (h) first, second, third and fourth holes passing through said sheet adjacent one end of said first, second, third and fourth manifolds, respectively, and in flow communication therewith via recessed flow channels whereby a plurality of said manifold units interleaved with appropriate interposed membrane structures may be assembled in stacked array with said first, second, third and fourth holes in vertical alignment.

2. The modular manifold unit as recited in claim 1, wherein the recessed manifolds are of tapered configuration to provide variable flow area.

3. The modular manifold unit as recited in claim 1, wherein spaced suspension sites are provided in said first and second exchange areas to support membrane structures thereon in spaced relationship with said fluid-impermeable barrier.

4. The modular manifold unit as recited in claim 1, wherein the first and second exchange areas are rectangular in shape and the recessed manifolds extend generally parallel to each other and to parallel sides of said exchange areas.

5. In a membrane exchange device wherein a plurality of laminae interleaved with membranes and arranged in stacked array define separate distribution systems for fluid flow, the improvement wherein the plurality of laminae consist of flat sheets having a plurality of recessed areas in opposite first and second major surfaces thereof and having a plurality of passageways passing through said sheet to define with said recessed areas two separate systems comprising:

(a) first and second juxtaposed exchange areas recessed into said first and second major surfaces, respectively, and separated from each other by a substantially fluid-impermeable barrier, (b) first and second longitudinally-extending manifolds recessed in said first major surface and located with said first exchange area disposed therebetween, (c) first and second sets of Z-shaped channels connected to and providing flow communication between said first and second manifolds, respectively, and said second exchange area, (d) first and second sets of passages interconnecting said first and second sets of Z-shaped channels, respectively, with said first exchange area, (e) third and fourth longitudinally-extending manifolds recessed in said second major surface and located with said second exchange area disposed therebetween, (f) third and fourth sets of Z-shaped channels connected to and providing flow communication from said third and fourth manifolds, respectively, to a series of terminals in said first major surface isolated from said first exchange area, (g) a plurality of passageways recessed in said second major surface and communicating with said second exchange area at least one of said passageways being vertically aligned with one of each of said series of terminals, (h) first, second, third and fourth holes passing through said sheet adjacent one end of said first, second, third and fourth manifolds, respectively, and in flow communication therewith via recessed flow channels, (1) said first, second, third and fourth holes being in vertical alignment in the stacked array to constitute vertical manifolds.

6. The improved membrane exchange device as recited in claim 5 wherein the membranes between adjacent flat sheets are in the form of membrane envelopes comprising first and second membranes and an apertured spacer all of which have holes in register with the first, second, third and fourth holes of each of said flat sheets and said first membrane and said apertured spacer further having holes therethrough in alignment with the series of terminals.

7. The improved membrane exchange device as recited in claim 5 wherein the flat sheets are arranged in pairs with the first major surfaces thereof in opposition there being a single membrane located therebetween and between adjacent pairs of said flat sheets.

8. A modular manifold unit consisting of a single flat sheet having a plurality of recessed areas in opposite first and second major surfaces thereof and having a plurality of passageways passing through said sheet to define with said recessed areas a system for the distribution of fluid flow, said passage system comprising:

(a) first and second juxtaposed exchange areas recessed into said first and second major surfaces, respectively, and separated from each other by a substantially fluid-impermeable barrier.

(b) first and second longitudinally-extending manifolds recessed in said first major surface and located with said first exchange area disposed therebetween, (c) first and second sets of Z-shaped channels connected to and providing flow communication between said first and second manifolds, respectively, and said second exchange area, (d) first and second sets of passages interconnecting said first and second sets of Z-shaped channels, respectively, with said first exchange area and (e) first, second, third and fourth holes passing through said sheet, said first and second holes being adjacent opposite ends of said first manifold and said third and fourth holes being adjacent opposite ends of said second manifold, said first and third holes being in flow communication with said first and second manifolds, respectively whereby a plurality of pairs of said manifold units with appropriate membrane structures interposed between all adjacent manifold units may be assembled in stacked array, the first major surfaces of the manifold units in each pair being in opposition.

9. The modular manifold unit as recited in claim 8, wherein the recessed manifolds are of tapered configuration to provide variable flow area.

10. The modular manifold unit as recited in claim 8, wherein spaced suspension sites are provided in said first and second exchange areas to support membrane structures thereon in spaced relationship with said fluid-impermeable barrier.

11. The modular manifold unit as recited in claim 8, wherein the first and second exchange areas are rectangular in shape and the recessed manifolds extend generally parallel to each other and to parallel sides of said exchange areas.

References Cited

UNITED STATES PATENTS

| | | | |
|---|---|---|---|
| 3,060,934 | 10/1962 | Claff et al. | 23—258.5 |
| 3,342,729 | 9/1967 | Strand | 23—258.5 |
| 3,396,849 | 8/1968 | Larde et al. | 23—258.5 |

REUBEN FRIEDMAN, Primary Examiner

R. BARNES, Assistant Examiner

U.S. Cl. X.R.

23—258.5